United States Patent
Reith

(10) Patent No.: US 10,145,300 B2
(45) Date of Patent: Dec. 4, 2018

(54) SYSTEMS AND METHODS FOR A CRANKSHAFT OF A PISTON ENGINE

(71) Applicant: Ford Global Technologies, LLC, Dearborn, MI (US)

(72) Inventor: Markus Reith, Köln (DE)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 15/415,772

(22) Filed: Jan. 25, 2017

(65) Prior Publication Data
US 2017/0218839 A1    Aug. 3, 2017

(30) Foreign Application Priority Data
Feb. 1, 2016   (DE) .......................... 10 2016 201 469

(51) Int. Cl.
*F02B 75/06*    (2006.01)
*F02B 75/32*    (2006.01)
*F16C 3/10*    (2006.01)

(52) U.S. Cl.
CPC .............. *F02B 75/32* (2013.01); *F02B 75/06* (2013.01); *F16C 3/10* (2013.01)

(58) Field of Classification Search
CPC ............. F02B 75/32; F02B 75/06; F16C 3/10
USPC ................................. 123/197, 1, 197.4, 192.2
See application file for complete search history.

(56) References Cited

U.S. PATENT DOCUMENTS

| | | | |
|---|---|---|---|
| 2,287,472 A | 6/1942 | Eby | |
| 4,785,772 A * | 11/1988 | Krotky | F16C 3/20 123/192.2 |
| 8,757,123 B2 * | 6/2014 | Hofbauer | F01B 7/08 123/192.2 |
| 2004/0211384 A1 * | 10/2004 | Glinsner | F02B 75/06 123/192.2 |
| 2008/0257296 A1 * | 10/2008 | Nishi | F16F 15/24 123/192.2 |
| 2014/0245985 A1 * | 9/2014 | Lach | F16F 15/283 123/192.2 |
| 2015/0060003 A1 * | 3/2015 | Murrish | B22C 9/103 164/129 |
| 2016/0084294 A1 * | 3/2016 | Tkac | B22C 9/10 74/596 |

(Continued)

FOREIGN PATENT DOCUMENTS

DE    10202547 C1    7/2003
DE    102004040565 A1    3/2006
(Continued)

*Primary Examiner* — Marguerite McMahon
(74) *Attorney, Agent, or Firm* — Julia Voutyras; McCoy Russell LLP

(57) ABSTRACT

Methods and systems are provided for the design and manufacture of a crankshaft of a piston internal combustion engine. In one example, a crankshaft comprises a crankshaft throw, the crankshaft throw comprising a crankpin and crank webs. The crank webs are formed asymmetrically in a region of the crankpin with respect to a plane intersecting an axis of rotation of the crankshaft and a center axis of the crankpin, such that the breaking strength of the crankshaft throw is increased at a crankshaft angle of rotation which differs from the top dead center position of a piston to which the crankpin is coupled, and at which the piston exerts a maximum combustion-induced force on the crankpin.

15 Claims, 5 Drawing Sheets

(56) References Cited

U.S. PATENT DOCUMENTS

2016/0146289 A1* 5/2016 Britton ................. F16F 15/283
                                                    74/574.2

FOREIGN PATENT DOCUMENTS

| WO | 8907704 A1 | 8/1989 |
| WO | 2016009641 A1 | 1/2016 |

* cited by examiner

SYSTEMS AND METHODS FOR A CRANKSHAFT OF A PISTON ENGINE

CROSS REFERENCE TO RELATED APPLICATION

The present application claims priority to German Patent Application No. 102016201469.2, filed on Feb. 1, 2016. The entire contents of the above-referenced application are hereby incorporated by reference in its entirety for all purposes.

FIELD

The current description relates to the design and structure of a crankshaft for a piston internal combustion engine or piston engine.

BACKGROUND\SUMMARY

The crank webs of a crankshaft are usually formed to be symmetric with respect to a longitudinal center axis which intersects the axis of rotation of the crankshaft, since the mass balancing of the countershafts must compensate for the rotating and translating parts of the connecting rods, bearings, and journals, and this mass balancing is calculable only when the center of gravity of the masses involved is known. A symmetric crank web is desirable when the centrifugal forces occurring during operation act perfectly symmetrically on an individual crankshaft portion consisting of two webs, two counterweights, two main bearings, and a crankpin.

However, the inventors herein have recognized potential issues with symmetric crank webs. As one example, combustion gas pressure does not act symmetrically on the crank webs, because it usually exerts the greatest force on the piston, connecting rod, and crankpin, only after top dead center. Specifically, the mixture injected into the cylinder combusts with a certain delay, and the highest gas pressure occurs close to the so-called CA50 point, which represents the crankshaft angle of rotation at which approximately 50% of the quantity of injected fuel has been combusted in the cylinder. The CA50 point may lie in a range from approximately 10° to 15°, or even up to 30°, after the top dead center of the piston.

In one example, the issues described above may be at least partially addressed by a crankshaft for a piston internal combustion engine, the crankshaft comprising a crankshaft throw, the crankshaft throw comprising crank webs that are formed asymmetrically in a region of a crankpin with respect to a plane intersecting an axis of rotation of the crankshaft and a center axis of the crankpin, such that the breaking strength of the crankshaft throw is increased at a crankshaft angle of rotation which differs from the top dead center and at which the highest combustion-induced force acts on the crankpin. By constructing the crankshaft webs to be asymmetric, the crankshaft can be subjected to equal or greater loading than a crankshaft of a larger or equal inherent weight having symmetric crankshaft webs.

In another example, a method for producing a crankshaft comprises generating a first crankshaft design which comprises a crankshaft with symmetrically formed crank webs; determining a distribution of loads in the crank webs which occur when a piston driving rotation of the crank webs exerts a maximum force on the crank webs; generating a second crankshaft design based on the first crankshaft design and the distribution of loads in the crank webs, where points of the crank webs which are more loaded at the maximum force are reinforced by the addition of crank web material; and manufacturing the crankshaft based on the second crankshaft design.

As yet another example, a crankshaft for an internal combustion engine comprises a crankpin, and a first crank web coupled to the crankpin, where a center of mass of the crank web is offset from a central axis of the crank web, and where the center of mass is more proximate a leading rotational edge and top of the crank web than a trailing rotational edge and bottom of the crank web.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
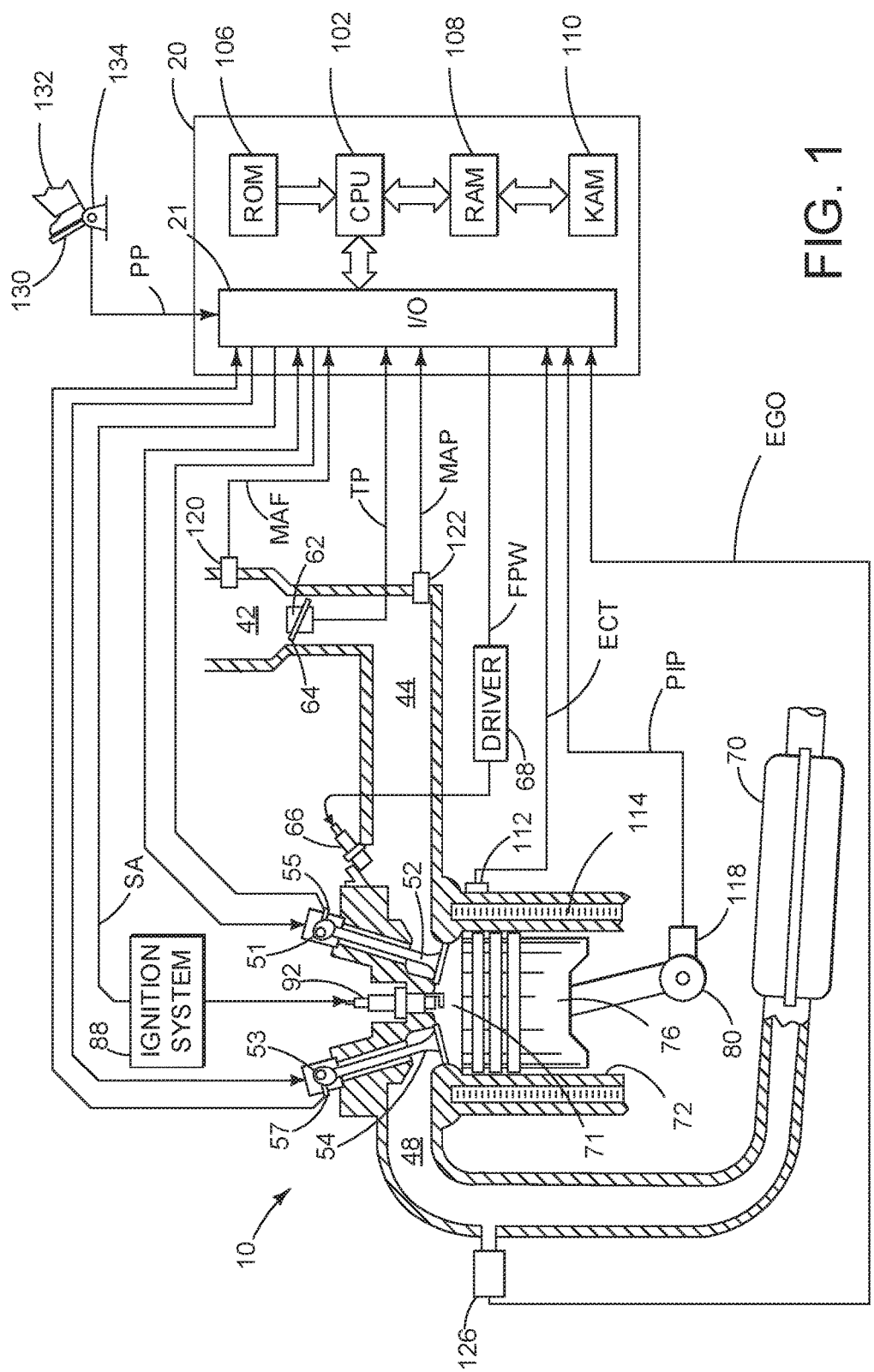
FIG. 1 shows a schematic diagram of an example engine system, in accordance with an embodiment of the present disclosure.
Figure 2:
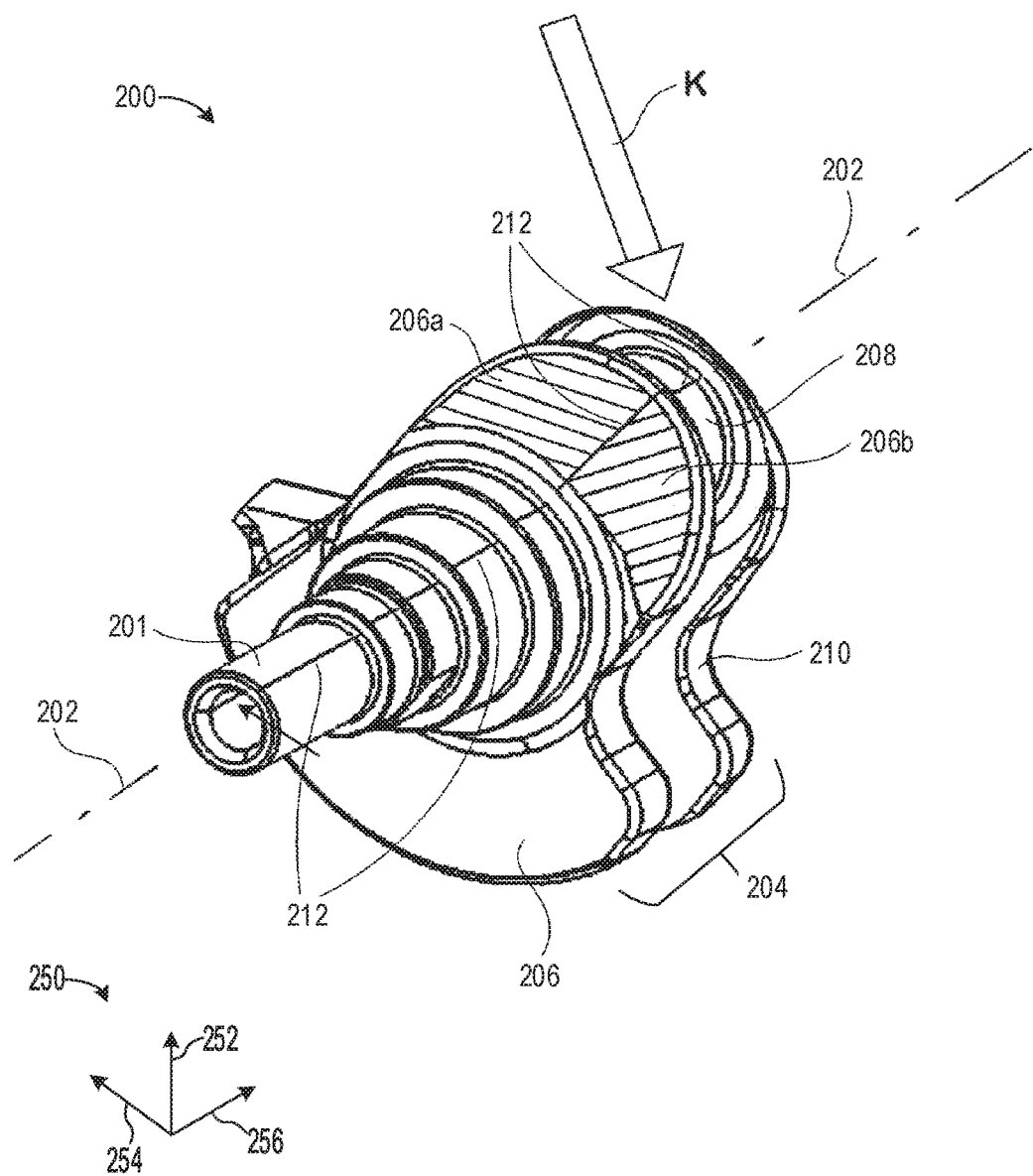
FIG. 2 shows a front isometric view of an example crankshaft of an engine system, such as the engine system of FIG. 1, in accordance with an embodiment of the present disclosure.
Figure 3:
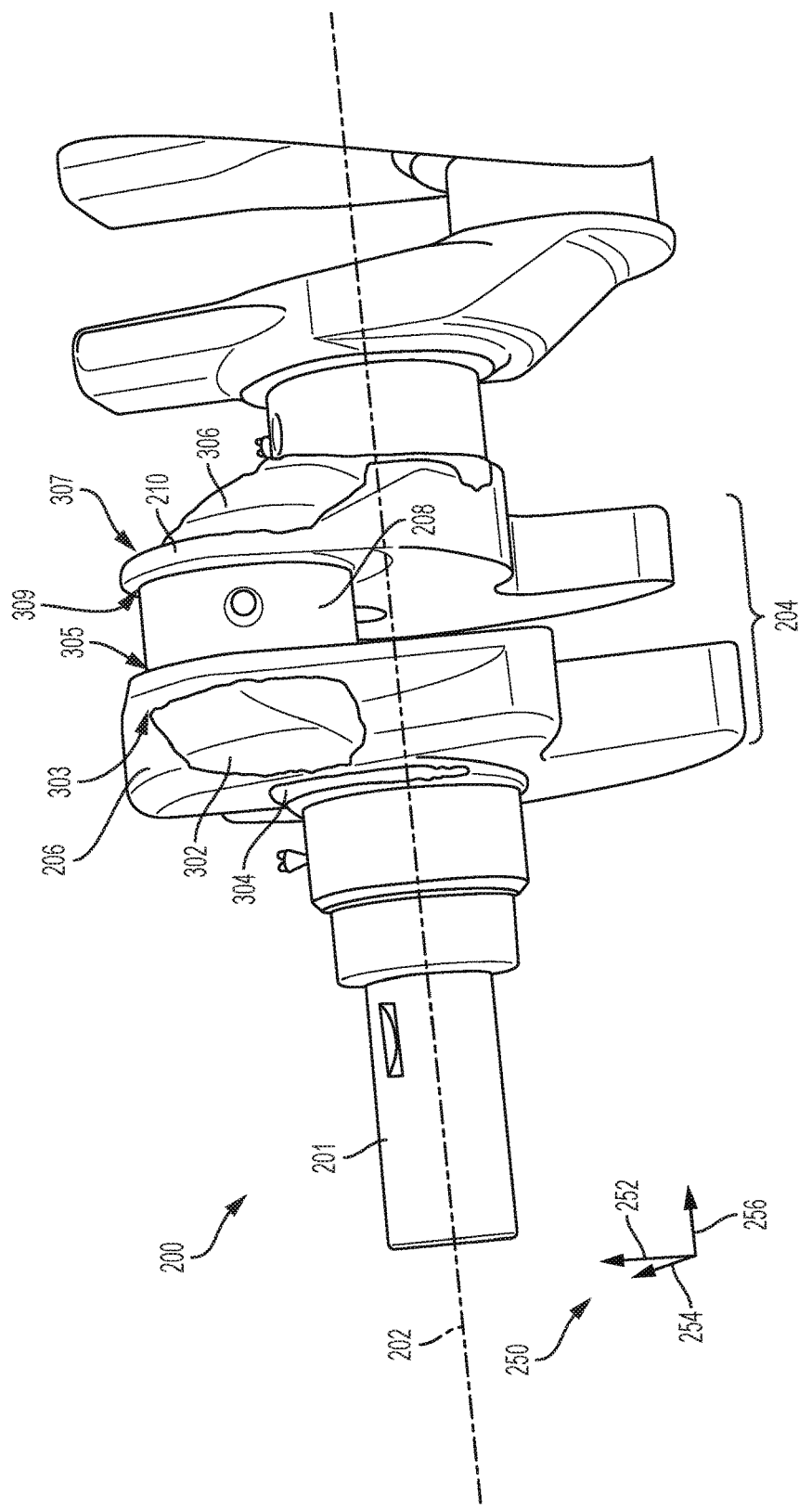
FIG. 3 shows a side isometric view of the example crankshaft of FIG. 2, including crank webs with asymmetric mass distributions, in accordance with an embodiment of the present disclosure.
Figure 4:
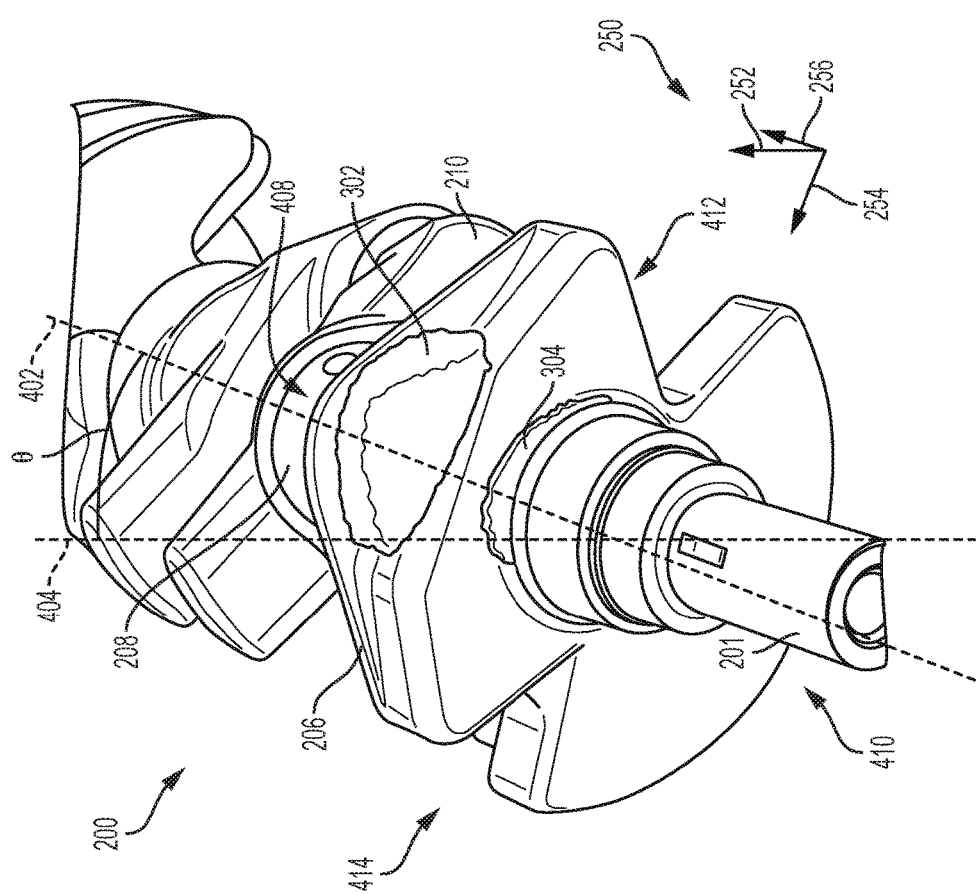
FIG. 4 shows a front isometric view of the example crankshaft of FIG. 3, in accordance with an embodiment of the present disclosure.

The following description relates to systems and methods for constructing a crankshaft of an internal combustion engine. An example internal combustion engine system is shown in FIG. 1. The crankshaft, an example of which is shown in FIGS. 2-4, includes webs that couple the crankpins to the main bearing journal of the crankshaft. In particular, the combination of crankpin and two connecting webs are commonly referred to as a crankshaft throw. The crankshaft may comprise one or more crankshaft throws, depending on the number of cylinders of the internal combustion engine, where the crankpin of each crankshaft throw is coupled to a reciprocating piston of the combustion engine by, for example, a connecting rod. Thus, each crankshaft throw may comprise a crankpin and two connecting webs, where the two connecting webs couple the crankpin to the main bearing journal of the crankshaft at a position offset from a central axis of the main bearing journals and crankshaft. That is, the crankpins may not share a common central axis with the main bearing journals of the crankshaft. However, the crankpins do circle around the same central rotational axis as the main bearing journals, via the coupling to the main bearing journals provided by the crank webs. Thus, each crankpin is driven by a reciprocating piston, and as each piston reciprocates between top dead center (TDC) and bottom dead center (BDC), the crankpins circle around the central axis of the crankshaft, driving rotation of the main bearing journals, and thereby converting the reciprocating motion of the piston into rotational motion of the crankshaft.

However, the peak force provided by combusting gasses in a cylinder of the internal combustion engine may not occur until after the piston reaches TDC. Thus, the maximum force output by the combusting gasses may occur during the power stroke while the piston is in-between TDC and BDC, and reciprocating towards BDC and away from TDC. Thus, as shown in the example FIGS. 2-4, the crank webs may be constructed such that the mass distribution of the crank webs is asymmetric with respect to a central axis of the crank webs (more heavily weighted towards one side of the crank webs than the other side). In this way, the crankshaft with asymmetric crank webs may withstand larger forces from the driving pistons when the combusting gasses within the combustion chambers exert their maximum force on the crankpins, for example, between 10° and 30° after TDC, than crankshafts including symmetric crank webs. As such, crankshaft durability and longevity may be increased relative to crankshafts including symmetric crank webs. As described in the example method of FIG. 5, the crank webs may be designed such that their mass distributions are not symmetric. That is, the crank webs may be designed and manufactured such that they are more heavily weighted towards a leading edge, such that their center of mass is offset from a central axis of the crank web.

Referring to FIG. 1, a schematic diagram showing one cylinder of multi-cylinder engine 10, which may be included in a propulsion system of an automobile, is illustrated. Engine 10 may be controlled at least partially by a control system including controller 20 and by input from a vehicle operator 132 via an input device 130. In this example, input device 130 includes an accelerator pedal and a pedal position sensor 134 for generating a proportional pedal position signal PP. Combustion chamber (i.e., cylinder) 71 of engine 10 may include combustion chamber walls 72 with piston 76 positioned therein. Piston 76 may be coupled to crankshaft 80 so that reciprocating motion of the piston is translated into rotational motion of the crankshaft. Crankshaft 80 may be coupled to at least one drive wheel of a vehicle via an intermediate transmission system. Further, a starter motor may be coupled to crankshaft 80 via a flywheel to enable a starting operation of engine 10. The piston 76 may be coupled to a crankpin included within the crankshaft 80, and may drive the crankpin to circle around a central axis of the crankshaft 80, as described in greater detail below with reference to FIG. 2. Thus, the piston 76 exerts a force on a crankpin. The crankpin in turn, revolves around main journals of the crankshaft, and converts reciprocating motion of the piston 76 into rotational motion of the crankshaft 80.

Combustion chamber 71 may receive intake air from intake manifold 44 via intake passage 42 and may exhaust combustion gases via exhaust passage 48. Intake manifold 44 and exhaust passage 48 can selectively communicate with combustion chamber 71 via respective intake valve 52 and exhaust valve 54. In some embodiments, combustion chamber 71 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 20 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 71 may alternatively include an intake valve controlled via electric valve actuation and an exhaust valve controlled via cam actuation including CPS and/or VCT systems.

Fuel injector 66 is shown arranged in intake manifold 44 in a configuration that provides what is known as port injection of fuel into the intake port upstream of combustion chamber 71. Fuel injector 66 may inject fuel in proportion to the pulse width of signal FPW received from controller 20 via electronic driver 68. Fuel may be delivered to fuel injector 66 by a fuel system (not shown) including a fuel tank, a fuel pump, and a fuel rail. In some embodiments, combustion chamber 71 may alternatively or additionally include a fuel injector coupled directly to combustion chamber 71 for injecting fuel directly therein, in a manner known as direct injection.

Intake passage 42 may include a throttle 62 having a throttle plate 64. In this particular example, the position of throttle plate 64 may be varied by controller 20 via a signal provided to an electric motor or actuator included with throttle 62, a configuration that is commonly referred to as electronic throttle control (ETC). In this manner, throttle 62 may be operated to vary the intake air provided to combustion chamber 71 among other engine cylinders. The position of throttle plate 64 may be provided to controller 20 by throttle position signal TP. Intake passage 42 may include a mass air flow sensor 120 and a manifold air pressure sensor 122 for providing respective signals MAF and MAP to controller 20.

Ignition system 88 can provide an ignition spark to combustion chamber 71 via spark plug 92 in response to spark advance signal SA from controller 20, under select operating modes. Though spark ignition components are shown, in some embodiments, combustion chamber 71 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 20 is shown in FIG. 1 as a microcomputer, including microprocessor unit 102, input/output ports 21, an electronic storage medium for executable programs and calibration values shown as read only memory chip 106 in this particular example, random access memory 108, keep alive memory 110, and a data bus. Controller 20 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 80; throttle position (TP) from a throttle position sensor; and absolute manifold pressure signal, MAP, from sensor 122. Engine speed signal, RPM, may be generated by controller 20 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory chip 106 can be programmed with computer readable data representing instructions executable by processor 20 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

Continuing to FIGS. 2-4, they show an example crankshaft 200 that may be included in an internal combustion engine, such as the engine 10 described above with reference to FIG. 1. Thus, crankshaft 200 may be the same or similar to crankshaft 80 described above with reference to FIG. 1.

FIGS. 2-4 are drawn approximately to scale and show the relative sizes and positioning of the components of the crankshaft 200. Further, FIGS. 2-4 show an axis system 250 including a vertical axis 252, a horizontal axis 254, and a lateral or longitudinal axis 256. The axis system 250 may be used to reference the relative positioning of components of the crankshaft 200. For example, components may be referred to as "above" or "below" one another with respect to the vertical axis 252, where for example, a first component said to be positioned "above" a second component, is positioned further along the positive direction of the vertical axis 252 than the second component. As another example, components may be referred to as "to the left of" and "to the right of" one another with respect to the horizontal axis 254. As another example, components may be referred to as "in front of" or "behind" one another with respect to the lateral axis 256. For example, a first component said to be positioned "behind" a second component, is positioned further along the positive direction of the lateral axis 256 than the second component.

Further, FIGS. 2-4 show example configurations with relative positioning of the various components of the crankshaft 200. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another.

Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Focusing first on FIG. 2, it shows a front isometric view of a portion of the crankshaft 200. The crankshaft 200 includes a shaft journal 201 which extends along a crankshaft central axis of rotation 202, which is indicated by the dotted line in FIG. 2, and a crankshaft throw 204 which comprises a first crank web 206, a crankpin 208 and a second crank web 210. Thus, the shaft journal 201 and crankshaft 200 share a common central axis (e.g., are coaxial), around which they both rotate. Both shaft journal 201 and crankshaft 200 therefore rotate around the central axis of rotation 202. Shaft journal 201 may comprise a crankshaft main bearing journal and as such may also be referred to herein as crankshaft main bearing journal 201.

At the periphery of the shaft journal 201, first crank web 206, and crankpin 208 there is indicated a partially interrupted line 6 which forms a longitudinal center line of the crankshaft throw 204 and which extends in a plane which intersects both the crankshaft axis of rotation 202 and the center axis of the crankpin 208.

In the example of FIG. 2, the crankshaft throw 204 is shown at an angle of rotation which is situated approximately 10° to 15° after the top dead center of the associated piston (e.g., 10° to 15° from TDC, while the piston is reciprocating towards BDC and away from TDC) and at which a maximum combustion-induced force "K" acts on the crankpin 208 during a combustion cycle, which force is situated at an inclined angle to the plane which intersects the crankshaft central axis of rotation 202 and the center axis of the crankpin 208.

Since the force K acts asymmetrically on the crankshaft throw, the halves of the webs 206 and 210 situated to the right of the line 212 in the example of FIG. 2 are partially loaded more greatly with pressure in the region of the crankpin 208 than the halves of the webs 206 and 210 situated to the left of the line 212.

The two differently loaded halves of the first crank web 206 are indicated in the figure as two hatched web regions 206a and 206b. Portions, or all of second web region 206b which is loaded more greatly with pressure at the piston position shown in the example of FIG. 2 than portions or all of the first web region 206a, are configured to be sturdier than portions or all of the web region 206a. The first web region 206a can thus accordingly be configured to be weaker such that material from the first web region 206a can be redistributed to the second web region 206b.

In view of all this, it must of course also be taken into consideration that the web region 206a is also loaded slightly in tension at the indicated angle of rotation of the crankshaft and, in order to deal with the tensile loading which occurs, a certain material redistribution can be effected within the web region 206a. Thus, the second web region 206b may be weighted more heavily. In some examples, the second web region 206b may have a higher density than the first web region 206a to achieve a greater weight than the first web region 206a. In other examples, the second web region 206 may comprise the same density, but may comprise more mass and therefore a greater volume than the first web region 206a to achieve a greater weight than the first web region 206a.

In some examples, as described in greater detail below with reference to FIG. 5, the web regions 206a and 206b may initially be designed to be the same weight and density (e.g., web 206 is designed to be symmetric about the line 6). Then, the symmetric webs and crankshaft may be coupled to an internal combustion engine and undergo testing to determine the loading on the webs. The webs can then be redesigned to shift mass and weight around in the webs. Thus, mass may be redistributed in the webs to make the webs stronger when the webs are rotated away from TDC, and the piston exerts a maximum force on the crankpin and webs. In this way, the center of mass of the web 206 may be shifted away from the line 6, and towards the right in the example of FIG. 2.

The unbalances which occur in the web regions 206a and 206b as a result of these material redistributions are balanced by suitable material redistributions in the radially opposite counterweights.

Turning to FIG. 3, it shows a side isometric view of the crankshaft 200 including crank web supports 302, 304, and 306. First crank web support 302 is coupled to the first crank web 206 on a front-facing surface 303 of the crank web 206, opposite a rear-facing surface 305 of the crank web 206, to which the crankpin 208 is coupled. The first crank web support 302 may extend downwards from a top of the web 206 and/or between the crankpin 208 and the central axis of rotation 202. In particular, the first crank web support 302 may extend along a portion of the front-facing surface 303 in an area approximately similar to the surface area of the rear-facing surface 305 which the crankpin 208 interfaces with. Thus, the support 302, may be diametrically opposed from the interface of the crankpin 208 and rear-facing surface 305. Second crank web support may be coupled to the front-facing surface 303, below the first crank web support 302, between the first crank web support 302 and the central axis of rotation 202. Third crank web support 306 may be coupled to a rear-facing surface 307 of the second crank web 210, opposite a front-facing surface 309 of the second crank web 210, to which the crankpin 208 is coupled.

The crank web supports 302, 304, and 306 may comprise the same or similar material to the crank webs 206 and 210, and may comprise one or more of the same density, elasticity, strength, hardness, etc. However, in other examples, the crank web supports 302, 304, and 306 may comprise different materials and/or different densities, elasticities, strengths, harnesses, etc., than the crank webs 206 and 210. In some examples, the first and third crank web supports 302 and 306, respectively, may be approximately the same or similar.

Further, in some examples, the crank web supports 302, 304, and 306 may be integrally formed with the crank webs 206 and 210. That is, the crank web supports 302, 304, and 306 may be formed at the same time with the crank webs 206 and 210, and the crank web supports 302 and 304 and the first crank web 206 may form a single continuous piece, and the crank web support 306 and the second crank web 210 may form a single continuous piece. That is, the crank web supports 302, 304, and 306 may generated during a design phase of the crankshaft 200. Therefore, the supports 302, 304, and 306 may be shown in FIGS. 3 and 4 as distinct elements from the webs 206 and 210, merely to show how the webs 206 and 210 may be adjusted from a symmetric design, and be redesigned to be asymmetric. Thus, in some examples, the crank web supports 302, 304, and 306 may not be formed separately from the crankshaft. Further, the web supports 302, 304, and 306 may not comprise adjustments made to the crankshaft 200 post production. Thus, the webs may be designed to by asymmetric, and may not be physically manipulated after they are constructed to redistribute mass. That is, a symmetric web design may be adjusted to an asymmetric web design, and then asymmetric webs may be manufactured.

However, in other examples, the crank web supports 302, 304, and 306 may be formed separately from the crank webs 206 and 210, and may then be coupled to the crank webs 206 and 210 via one or more of adhesives, fasteners, etc. In yet further examples, the second crank web 210 may additionally include a fourth crank web (not shown in FIG. 3) that may be the same or similar to second crank web support 304, and may be positioned on the rear-facing surface 307, below the third crank web support 306, between the third crank web support 306 and the central axis of rotation 202.

In yet further examples, the crank web supports 302, 304, and 306 may be formed by physically redistributing mass in already constructed webs 206 and 210. Thus, the webs 206 and 210 may in some examples be constructed to be symmetric, and then may be machined and/or physically manipulated afterwards to redistribute weight.

Continuing to FIG. 4, it shows a front isometric view of the crankshaft 200, similar to the view of the crankshaft 200 shown above in FIG. 2. In FIG. 4, a central axis 402 of the crank web 206 is shown which is orthogonal to the central axis of rotation 202 of the crankshaft 200. The central axis 402 of the crank web 206 passes through the central axis of rotation 202 of the crankshaft 200 and may divide the crank web 206 in half. A top dead center position of the crank web 206 is shown by dotted line 404. Thus, when the piston to which the crankpin 208 is coupled (e.g., piston 76 described above in FIG. 1) is at its top dead center position, the central axis 402 of the crank web 206 may be in the orientation depicted by the dotted line 404. Thus, when the piston is at its top dead center position, the web 206 may be orientated straight with respect to the vertical axis 252, such that its central axis 402 is parallel to the vertical axis 252. Further, a top 408 of the web 206 is vertically above a bottom 210 of the web 206 at the top dead center position of the piston. In the example of FIG. 2, the web 206 and crankshaft 200 are shown rotated clockwise from the top dead center position by an angle, θ.

The angle θ may correspond to an angle at which the combustion gasses in the combustion chamber including the piston (e.g., combustion chamber 71 described above in FIG. 1) exert a maximum force on the piston and crankpin 208. In particular angle θ may correspond to an angle at which approximately 50% of the injected fuel during a single combustion cycle has combusted. Angle θ may be an angle in a range of angles between 10° and 30° from top dead center. In the example of FIG. 4, the crankshaft 200 rotates in the clockwise direction, such that the top 408 of the web 206 is vertically above the bottom 410 of the web 206 at the top dead center position, and the bottom 410 of the web 206 is vertically above the top 408 of the web 206 at the bottom dead center position. Thus, in the position shown in the example of FIG. 4, the piston is between top dead center and bottom dead center, and is reciprocating towards the bottom dead center position, and away from the top dead center position.

A leading edge 412 of the web 206 is positioned opposite a trailing edge 414 of the web 206, and the leading edge 412 is rotationally ahead or in front of the trailing edge 414. In particular, as the crankshaft 200 and web 206 rotate clockwise in the example of FIG. 4, the leading edge 412 is ahead of the trailing edge 414 relative to the position of the piston. For example, as the piston reciprocates from top dead center to bottom dead center, the leading edge 412 will reach the bottom of its circular trajectory before the trailing edge 414. In the example of FIG. 4, the leading edge 412 is positioned to the right of the trailing edge 414.

As shown in the example of FIG. 4, the crank support 302 may not be symmetric about the central axis 402. In particular, the crank support 302 may be weighted more heavily towards the leading edge 412, and away from trailing edge 414. Thus, the crank support 302 may include more mass to the right of the central axis 402 than to the left, in the example of FIG. 4. In some examples, the crank support 302 may not comprise a symmetric shape, but may be positioned approximately equidistant from the trailing and leading edges 414 and 412, respectively. In other examples the crank support may not comprise a symmetric shape and may be positioned more proximate the leading edge 412 than the trailing edge 414. In example where the crank support 302 is asymmetric, the crank support 302 may be thicker (wider along the longitudinal axis 256) more proximate the leading edge 412 than the trailing edge 414.

In other examples, the crank support 302 may be symmetric. In examples where the crank support 302 is symmetric and is positioned equidistantly from the leading and trailing edges 412 and 414, the crank support 302 may be more dense more proximate the leading edge 412, and less dense more proximate the trailing edge 414. In other examples, where the crank support 302 is symmetric and is positioned more proximate the leading edge 412 than the trailing edge 414, the crank support may comprise a uniform density.

In all of the above examples, the crank support 302 is configured to have a center of mass that is shifted towards the leading edge 412 away from the trailing edge 414. That is, the center of mass of the crank support 302 is more proximate the leading edge 412 than the trailing edge 414 and thus is to the right of the central axis 402 in the example of FIG. 4.

Thus, the center of mass of the crank web 206 may also be shifted towards the leading edge 412, away from the trailing edge 414. Further, mass may be shifted towards the top 408 and away from the bottom 410 of the crank web 206. That is, the center of mass of the crank web 206 may be more proximate the leading edge 412 than the trailing edge 414 and thus is to the right of the central axis 402 in the example of FIG. 4.

In the example of FIG. 4, the crank web 206 may be more loaded by the force of the piston and combustion gasses at positions of the crank web 206 more proximate the leading edge 412 than the trailing edge 414 as shown by the force vector "K" in FIG. 2. Thus, points of the crank web 206 which are lesser loaded at the maximum force of the combustion gasses (e.g., more proximate the trailing edge 414) may be weakened by removal of crank web material. Further crank web material may be added to the more loaded points of the crank web 206, more proximate the leading edge 412 of the crank web 206. Thus, the web 206 may first be designed to be symmetric, and then mass may be added to the more loaded points of the crank web 206 that exist when the combustion gasses are exerting their maximum or close to their maximum force on the piston and crankpin 208 (between 10° and 30° after top dead center). The amount of crank web material used for reinforcement at the more loaded portions of the web 206 may be approximately equal to an amount of material removed from lesser loaded points. In other examples the amount of crank web material used for reinforcement may be less than an amount of material removed from lesser loaded points.

Figure 5:
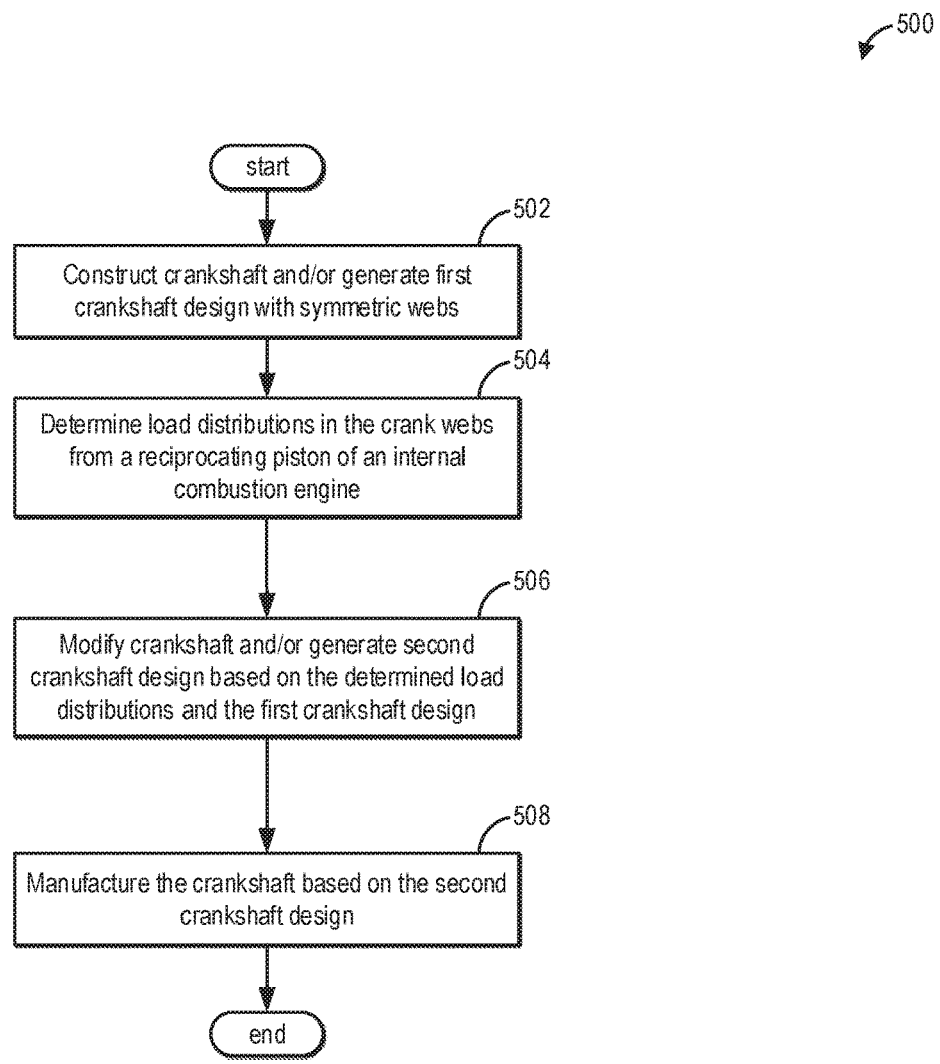
FIG. 5 shows a flow chart of an example method for designing and manufacturing a crankshaft, such as the example crankshaft of FIGS. 2-4, in accordance with an embodiment of the present disclosure.

Turning to FIG. 5, it shows a flow chart of an example method 500 for designing and manufacturing a crankshaft (e.g., crankshaft 200 described above with reference to FIGS. 2-4) and crank web (e.g., crank web 206 described above with reference to FIGS. 2-4). In particular a symmetrical crank web has points which are lesser loaded at the CA50 point than corresponding points on the opposite side of its longitudinal center axis which, for their part, are more greatly loaded. Therefore, the more greatly loaded points can be reinforced with additional material without this having to be done on the opposite side, where, moreover, material can be saved at lesser loaded points.

In other words, in the case of the crankshaft according to the invention, at the angle of rotation of the force maximum for which the crankshaft throw is formed asymmetrically in a strength-increasing manner, the breaking strength of the crankshaft throw is higher than that of a corresponding crankshaft throw having crank webs which are formed symmetrically with the same amount of material. Thus, the crankshaft can either be made lighter without durability losses or made more durable with the same weight.

What the invention thus teaches is not to design crank webs in such a way that, in addition to the centrifugal forces which occur, they also withstand the highest pressure forces which, for the sake of simplicity, were previously assumed as acting at the top dead center, but with consideration to the fact that the crank webs experience the highest pressure forces only more or less far behind the top dead center.

The asymmetry of the crank webs and the associated asymmetrical distribution of the crank web material lie in particular in geometric deviations from a mirror symmetry with respect to the plane which passes through the axis of rotation of the crankshaft and the axis of rotation of the crankpin.

Method 500 begins at 502 which comprises constructing a crankshaft and generating a first crankshaft design with symmetrically formed crank webs. In some examples, the crankshaft may be designed such that it is rigid enough to withstand all loads occurring during its service life.

Method 500 then continues from 502 to 504 which comprises, on the basis of the first crankshaft design, an actual crankshaft can be produced and installed in an internal combustion engine and the crankshaft angle of rotation at which the highest combustion-induced force acts on the crankpin (e.g., crankpin 208 described above with reference to FIGS. 2-4) can be determined by means of dynamometer tests. The distribution of the loads in the crank webs which occur at the force maximum can also be determined experimentally, for example by means of expansion and compression sensors.

Alternatively, the method 500 at 504 may comprise determining the angle of rotation of the computationally designed crankshaft at which the highest combustion-induced force acts on the crankpin by the use of empirical values, and it is then possible, on the basis of the design data of the crankshaft having symmetrically formed crank webs, to calculate the spatial distribution of the loads in the crank webs which occur at the force maximum.

After the distribution of the loads in the crank webs which occur at the force maximum has been determined experimentally and/or computationally, method 500 continues from 504 to 506 which comprises modifying the crankshaft and/or generating a second crankshaft design based on the first crankshaft design and the determined load distributions. In particular, the method 500 at 506 may comprise redesigned the first crankshaft design, with points of the crank webs which are more greatly loaded at the force maximum being reinforced by the addition of crank web material, and actual crankshafts can then be produced on the basis of the design data thus obtained.

The steps of determining load distributions and of locally adding crank web material can be carried out repeatedly in order to carry out fine tuning and to gradually give the crankshaft its final form.

Method 500 may then continue to 508 from 506 which comprises constructing the crankshaft based on the second crankshaft design.

Here, it is possible not only for crank web material to be added but it is also possible for points of the crank webs which are lesser loaded at the force maximum to be weakened by removal of crank web material, with it being possible for the amount of material used for reinforcement to be substantially equal to or less than the amount of material removed from lesser loaded points.

Moreover, asymmetric addition or redistribution of crank web material first creates an unbalance, but this is compensated for by an appropriate redesign of the counterweights.

In one representation, a crankshaft for a piston internal combustion engine, may comprise a crankshaft throw, the crankshaft throw including crank webs formed asymmetrically in a region of a crankpin with respect to a plane intersecting an axis of rotation of the crankshaft and a center axis of the crankpin, such that the breaking strength of the crankshaft throw is increased at a crankshaft angle of rotation which is different than top dead center and at which the highest combustion-induced force acts on the crankpin. In a first example, the crankshaft the breaking strength of the crankshaft throw at the highest combustion-induced force is higher than that of a corresponding crankshaft throw having crank webs which are formed symmetrically with the same amount of material. A second example of the crankshaft optionally includes the first example and further includes that the asymmetry of the crank webs lies in geometric deviations from a mirror symmetry with respect to the plane which passes through the axis of rotation of the crankshaft and the axis of rotation of the crankpin. A third example of the crankshaft optionally includes the first and/or second example, and further includes that the angle of rotation for which the crankshaft throw is formed asymmetrically in a strength-increasing manner corresponds to an angle of rotation at which approximately 50% of a quantity of fuel injected into a combustion chamber including a piston coupled to the crankpin has been combusted and a maximum combustion gas pressure acts on the piston. A fourth example of the crankshaft optionally includes one or more of the first through third example, and further includes that the angle of rotation for which the crankshaft throw is formed asymmetrically in a strength-increasing manner lies in a range from approximately 10° to 30° after top dead center piston position.

In another representation, a method for producing a crankshaft comprises generating a first crankshaft design which comprises a crankshaft with symmetrically formed crank webs; determining a distribution of loads in the crank webs which occur when a piston driving rotation of the crank webs exerts a maximum force on the crank webs; generating a second crankshaft design based on the first crankshaft design and the distribution of loads in the crank webs, where points of the crank webs which are more loaded at the maximum force are reinforced by the addition of crank web material; and manufacturing the crankshaft based on the second crankshaft design. In a first example of the method, the method may optionally include that the generating the first crankshaft design, determining the distribution of loads, and generating the second crankshaft design are carried out repeatedly in a loop, where the load distribution in the second crankshaft design is recalculated. A second example of the method optionally includes the first example and further includes that points of the crank webs which are lesser loaded at the maximum force are weakened by removal of crank web material. A third example of the method optionally includes the first and/or second examples and further includes that wherein the amount of crank web material used for reinforcement is substantially equal to an amount of material removed from lesser loaded points. A fourth example of the method optionally includes one or more of the first through third examples, and further includes that wherein the amount of crank web material used for reinforcement is less than an amount of material removed from lesser loaded points.

In another representation, a crankshaft for an internal combustion engine comprises a crankpin, and a first crank web coupled to the crankpin, where a center of mass of the crank web is more proximate a leading rotational edge of the crank web than a trailing rotational edge of the crank web. A first example of the crankshaft optionally includes that the leading rotational edge of the crank web is in front of the trailing rotational edge of the crank web relative to a direction of rotation of the crankshaft and a piston to which the crankpin is coupled. A second example of the crankshaft optionally includes the first example and further includes that the crank web is symmetric in shape but not in density, where the density of the crank web is greater more proximate the leading rotational edge of the crank web than the trailing rotational edge of the crank web. A third example of the crankshaft optionally includes one or more of the first and second examples, and further includes that the crank web is asymmetric in shape, where the crank web is thicker more proximate the leading rotational edge of the crank web than the trailing rotational edge of the crank web. A fourth example of the crankshaft optionally includes one or more of the first through third examples, and further comprises a first web support coupled to the crank web to shift the center of mass of the crank web towards the leading rotational edge of the crank web and away from the trailing rotational edge. A fifth example of the crankshaft optionally includes one or more of the first through fourth examples and further includes that the web support is coupled to the crank web on a surface of the crank web opposite the crankpin, between the crankpin and a central axis of the crankshaft. A sixth example of the crankshaft optionally includes one or more of the first through fifth examples and further includes a second web support coupled to the crank web on the surface of the crank web opposite the crankpin, between the first web support and the central axis of the crankshaft. A seventh example of the crankshaft optionally includes one or more of the first through sixth examples, and further includes that the web support is positioned more proximate the leading rotational edge of the crank web than the trailing rotational edge of the crank web. An eighth example of the crankshaft optionally includes one or more of the first through seventh examples, and further includes that the web support is positioned approximately equidistant between the leading rotational edge and the trailing rotational edge of the crank web, but is more heavily weighted towards the leading rotational edge than the trailing rotational edge. A ninth example of the crankshaft optionally includes one or more of the first through eighth examples and further comprises a second crank web coupled to the crankpin on a side of the crankpin opposite the first crank web, where a center of mass of the second crank web is more proximate a leading rotational edge of the second crank web than a trailing rotational edge of the second crank web.

In this way, by shifting the center of mass towards the leading edge of the crank web, a technical effect of increasing crankshaft strength, durability, and longevity is achieved. In particular, the amount of force at which the crankshaft will break is increased at a piston angle where a maximum amount of force is exerted on the piston by the combustion gasses for a combustion cycle. Thus, since the maximum force exerted by the piston during a combustion cycle may be during the power stroke, after the piston has reached top dead center and is reciprocating towards bottom dead center, an asymmetric mass distribution for the crank web increases the load that the crankshaft can tolerate without breaking.

It will be appreciated by those skilled in the art that although the present application has been described by way of example and with reference to the one or more examples above, it is not limited to the disclosed examples and that alternative examples could be constructed without departing from the scope of the present application as defined by the appended claims.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A crankshaft for a piston internal combustion engine, comprising:
a crankshaft throw, the crankshaft throw including crank webs formed asymmetrically in a region of a crankpin with respect to a plane intersecting an axis of rotation of the crankshaft and a center axis of the crankpin, such that a breaking strength of the crankshaft throw is increased at a crankshaft angle of rotation which is different than top dead center and at which a highest combustion-induced force acts on the crankpin.

2. The crankshaft of claim 1, wherein the breaking strength of the crankshaft throw at the highest combustion-induced force is higher than that of a corresponding crankshaft throw having crank webs which are formed symmetrically with the same amount of material.

3. The crankshaft of claim 1, wherein the asymmetry of the crank webs lies in geometric deviations from a mirror symmetry with respect to the plane which passes through the axis of rotation of the crankshaft and the axis of rotation of the crankpin.

4. The crankshaft of claim 1, wherein the angle of rotation for which the crankshaft throw is formed asymmetrically in a strength-increasing manner corresponds to an angle of rotation at which approximately 50% of a quantity of fuel injected into a combustion chamber including a piston coupled to the crankpin has been combusted and a maximum combustion gas pressure acts on a piston.

5. The crankshaft of claim 1, wherein the angle of rotation for which the crankshaft throw is formed asymmetrically in a strength-increasing manner lies in a range from approximately 10° to 30° after top dead center piston position.

6. A crankshaft for an internal combustion engine comprising:
a crankpin; and
a first crank web coupled to the crankpin, where a center of mass of the crank web is offset from a central axis of the crank web, and where the center of mass is more proximate a leading rotational edge of the crank web than a trailing rotational edge of the crank web.

7. The crankshaft of claim 6, wherein the leading rotational edge of the crank web is in front of the trailing rotational edge of the crank web relative to a direction of rotation of the crankshaft and a piston to which the crankpin is coupled.

8. The crankshaft of claim 6, wherein the crank web is symmetric in shape but not in density, where the density of the crank web is greater more proximate the leading rotational edge of the crank web than the trailing rotational edge of the crank web.

9. The crankshaft of claim 6, wherein the crank web is asymmetric in shape, where the crank web is thicker more proximate the leading rotational edge of the crank web than the trailing rotational edge of the crank web.

10. The crankshaft of claim 6, wherein a first web support is coupled to the crank web to shift the center of mass of the crank web towards the leading rotational edge of the crank web and away from the trailing rotational edge.

11. The crankshaft of claim 10, wherein the web support is coupled to the crank web on a surface of the crank web opposite the crankpin, between the crankpin and a central axis of the crankshaft.

12. The crankshaft of claim 11, wherein a second web support is coupled to the crank web on the surface of the crank web opposite the crankpin, between the first web support and the central axis of the crankshaft.

13. The crankshaft of claim 10, wherein the web support is positioned more proximate the leading rotational edge of the crank web than the trailing rotational edge of the crank web.

14. The crankshaft of claim 10, wherein the web support is positioned approximately equidistant between the leading rotational edge and the trailing rotational edge of the crank web, but is more heavily weighted towards the leading rotational edge than the trailing rotational edge.

15. The crankshaft of claim 6, further comprising a second crank web coupled to the crankpin on a side of the crankpin opposite the first crank web, where a center of mass of the second crank web is more proximate a leading rotational edge of the second crank web than a trailing rotational edge of the second crank web.

* * * * *